United States Patent [19]
Young et al.

[11] Patent Number: 5,708,460
[45] Date of Patent: Jan. 13, 1998

[54] TOUCH SCREEN

[75] Inventors: Thomas M. Young, Oakland; William Martin Becker, San Carlos; Joseph Shamash, Orinda, all of Calif.

[73] Assignee: AVI Systems, Inc., Oakland, Calif.

[21] Appl. No.: 460,647

[22] Filed: Jun. 2, 1995

[51] Int. Cl.$^6$ ........................................ G09G 5/00
[52] U.S. Cl. ..................... 345/173; 345/174; 178/18
[58] Field of Search ............................ 345/173, 174; 178/18, 19

[56] References Cited

U.S. PATENT DOCUMENTS

| | | | |
|---|---|---|---|
| 5,038,142 | 8/1991 | Flowers et al. | 345/173 |
| 5,327,163 | 7/1994 | Hashimoto et al. | 345/173 |
| 5,463,388 | 10/1995 | Boie et al. | 345/174 |

*Primary Examiner*—Mark R. Powell
*Assistant Examiner*—Matthew Luu
*Attorney, Agent, or Firm*—Steinberg Raskin & Davidson P.C.

[57] ABSTRACT

A touch screen or touch panel wherein there is a monitoring of relative distribution of force via one or more, preferably symmetrically positioned, sensors such as strain gage sensors. The strain gage sensors are positioned such that bending strain on the touch screen, engendered by touch, is detected by the one or more strain gages and accurately measured by an electronic controller, connected to the strain gage(s). The electronic controller, or associated hardware, is programmed to relate relative bending force to a unique position on the screen and is a charge balancing and multiplying analog-to-digital converter which provides accurate position determination, even with very low forces and with very minor differentiation in position related forces. A sum and divide analog-to-digital converter uses charge balancing and integration, with the balance charge coming from the plus and minus sum of the corners (wherein four sensors are positioned at the corners of a square or rectangular display), and the input signal is the difference between two sides of the display panel. This, in effect, results in the input signal being divided by the sum signal and the sum of charge counts over a fixed interval, resulting in the output value and unique position determination. A unique mounting structure for flat panel displays includes using the flat panel as the bending beam and wherein a circuit board mounted behind the flat panel transmits forces to sensors mounted on the circuit board.

18 Claims, 5 Drawing Sheets

TOUCH SCREEN

FIELD OF THE INVENTION

This invention relates to touch screens for computer applications and particularly to touch screens having accurate touch location identification by means of force sensors which identify position based on relative touch force exerted on the screen.

BACKGROUND OF THE INVENTION

Touch screens used in computer applications, such as cash register-inventory control devices, CRTs and flat panel displays, as well as POS (point of sale), kiosks, restaurants, gaming systems, industrial control, telephone, control devices and general purpose computers; have included sophisticated and costly electronics. In resistive touch screens finger placement on specific areas of the screen completes a circuit, with a message having been sent thereby to computer means for processing. Each area on the screen is micro-wired on a grid, with unique circuit characteristics, whereby the particular area which is touched is identifiable. Since each area is wired by a grid, the wide area, with direct contact, increases the possibility of grid breakage, under touch pressure, with possible resultant malfunction. Other touch screens include those of the capacitive type (using capacitive sensors) which put out a low AC voltage field across the surface of the screen. When a finger touches the sensor area, the capacitive properties of the finger draws current to the point touched, which is then registered by the system. Accordingly such system will not respond to touch with a glove or a non-capacitive stylus.

In another type of touch screen, surface acoustic wave sensors (SAW) on a glass transmit waves across a screen area, which when touched, creates a disturbance in the wave pattern which allows the system to determine area being touched. However, such devices are subject to permanent touch spots and moisture on the surface can inadvertently set it off.

IR (infra red) touch screens operate with beams in a grid form which are broken to determine a signal position. However these devices are subject to low resolution.

Recently, touch screens have been described, wherein strain gages, with force sensing means, are utilized to measure unique strain or forces at different finger touch locations, in order to identify areas and to provide operability for indicated commands at such locations, as described in U.S. Pat. No. 5,241,308. These strain gages emit signals which are unique for different positions being touched on the panel. However, because the forces involved are very low, high accuracy of force sensing means is required for proper operation. Primarily foil gages have been used but such technology has been essentially abandoned because of problems resulting from creep, low signals and signal to noise ratio, as well as calibration problems.

It is accordingly, an object of the present invention to provide an economical and accurate touch screen with force sensing means.

It is another object of the present invention to provide such touch screen with reliable operation wherein exerted force is indirectly measured.

These and other objects, features and advantages of the present invention will become more evident from the following discussion and drawings in which:

SHORT DESCRIPTION OF THE DRAWINGS

SUMMARY OF THE INVENTION

Figure 1:
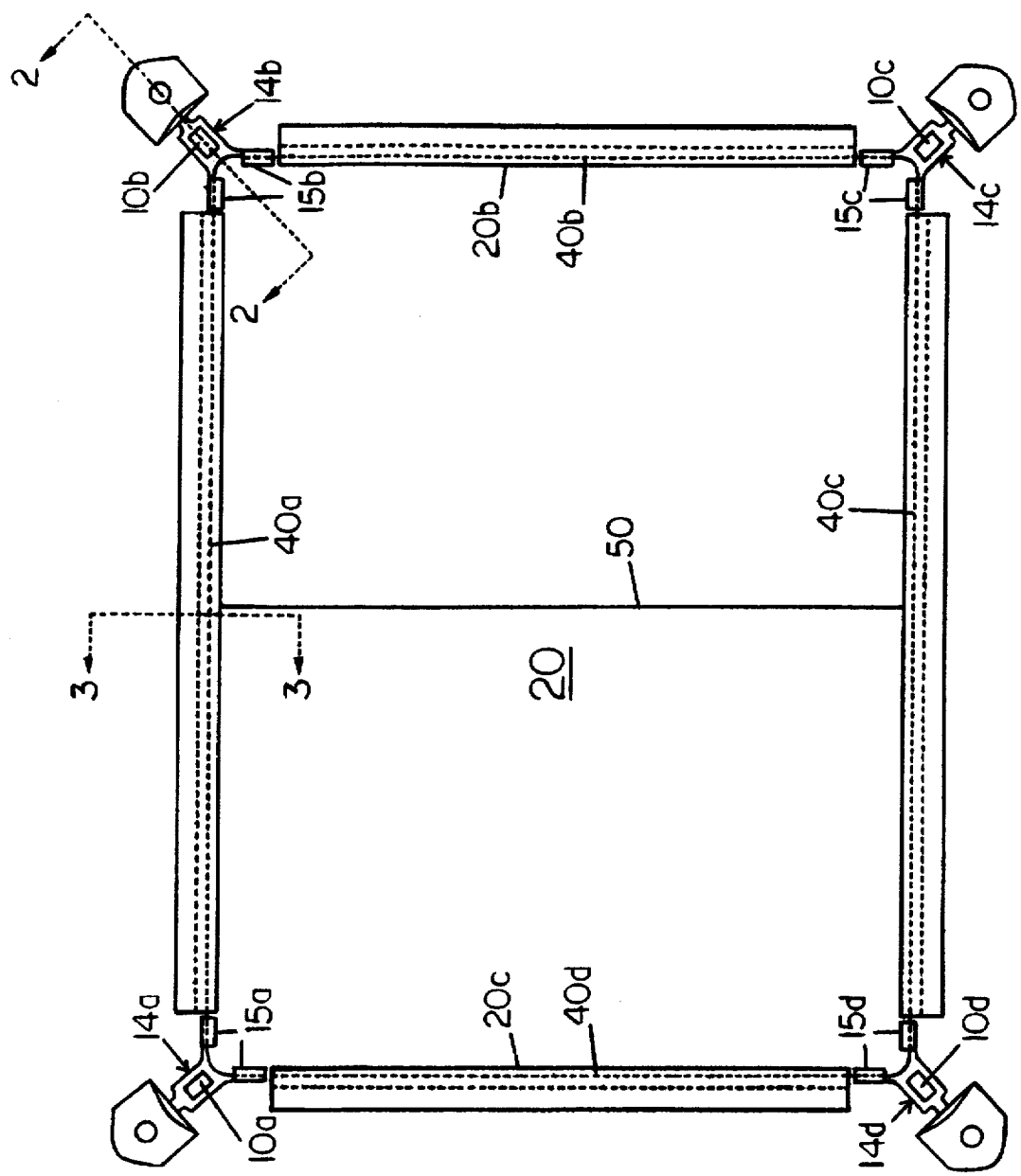
FIG. 1 depicts four strain gages, as corner mounted with brackets, on a touch screen of the present invention.

Generally the present invention comprises a touch screen or touch panel (referred to hereinafter collectively as "touch screen") wherein there is a monitoring of relative distribution of force via one or more and preferably at least three, preferably symmetrically positioned, sensors such as strain gage sensors, acoustic wave sensors, capacitive sensors and the like. The sensors, such as strain gage sensors are positioned such that bending strain on the touch screen, engendered by touch, is detected by the one or more strain gages and accurately measured by position determining means comprising, for example, an electronic controller, connected to the strain gage(s). The electronic controller, or associated hardware, is programmed to relate relative bending force to a unique position on the screen. Both the composition and structure of the screen being touched are adapted to provide a unique relative force at each touch zone, whereby the touch zone is identifiable by such force.

In accordance with the present invention the position determining means comprises a charge balancing and multiplying analog-to-digital converter which provides accurate position determination, even with very low forces and with very minor differentiation in position related forces. A sum and divide analog-to-digital converter uses charge balancing and integration similar to the front end of a sigma delta converter. The balance charge comes from the plus and minus sum of the corners (wherein four sensors are positioned at the corners of a square or rectangular display). The input signal is the difference between two sides of the display panel. This, in effect, results in the input signal being divided by the sum signal and the sum of charge counts over a fixed interval, resulting in the output value.

In order to provide such accurate determinations with very low forces and minor differentiation in position related forces, it is desirable to further minimize noise generation by effective filtration out of resonant effects. It is also desirable to maximize resonant frequency of the touch screen by constructing the touch screen with a stiff, low mass structure with a wide dynamic range being generated. Stiffness, as required for the screen of the present invention is of a degree which permits for detectable and reproducible bending movement of the screen under exerted touch forces. The degree of mass particularly that of low mass is such that there is little if any damping effects which may interfere with the detection of the magnitude of the force or touch related bending movement.

DETAILED DESCRIPTION OF THE INVENTION

There are basically two types of touch screen platforms (CRT displays and flat panel displays, "FPD") currently extant and each requires a somewhat different structural configuration for operability in accordance with the present invention.

With a CRT display, a metal stand is used to support the CRT display or the touch screen glass. Strain gage sensors, (highly improved over the foil strain gages of the prior art, whose use has been essentially abandoned) as described in co-pending application Ser. No., entitled DIRECT ADHERING POLYSILICON BASED STRAIN GAGE, filed on May 26, 1995, the disclosure of which is incorporated herein by reference thereto, are placed on the stand in a back to back configuration and a flex circuit is utilized to interconnect the sensors at shield positions peripheral to the CRT display. In such configuration, the stand mechanically directly or indirectly supports the touch glass which is sandwiched between the CRT and the front bezel (bolted on the four corner ears thus requiring no additional (or minimal modification of existing CRT display designs. In such embodiment, sensors are affixed to the metal stand at the corners to read touch forces on the glass, via forces transmitted through the adjacent metal of the stand to the sensor connected thereto. The sensors are solid silicon beams with half bridge on top and bottom respectively and wherein there is a direct edge attachment of the silicon to the circuit board with solder such as with use of invar clips and the like.

In flat panel applications, the sensors may be supported directly on the electronic circuit board positioned behind the display, used as the touch screen surface. This type of utilization is similar to that of weight sensing scales which detect a single force to measure weight. Alternatively, the sensors are embedded directly in the glass surface, which allows the area at the sensor perimeter to become active. In a further embodiment, the sensors, when positioned in the circuit board behind the flat panel display, are enclosed within a ceramic housing and wherein the housing is soldered to the circuit board, to eliminate any creep effect resulting from adhesive attachment or from temperature changes.

In further embodiments, the corner mounts previously described, may be replaced by foil torsion beams and an intermediate controller board can be used as the bending beam. With the use of the foil torsion beams, there is created a simple strain topology in the sensor. Any surface, not just glass may be utilized as the touch panel, provided it has the requisite characteristics of stiffness, low mass and high frequency. Materials for the touch panel include wood, plastic, metal, etc., which are selected for the requisite characteristics. Non-transparent materials are utilizable as separate touch pads independent of the visible screen surface. By using these materials, the touch panel can be used as a measuring or pointing device such as in scales or joy sticks, which can require the same features in a slightly different mechanical (but otherwise essentially the same) configuration.

Sealing of the CRT and the FPD to housings must be effected without negating the measurable strain resonance. Accordingly, with CRT's, sealing is effected by means of a non-contact dust lip. In addition and particularly with flat displays or surfaces, ferro fluids are used to this effect, as a method to achieve low contact pressure sealing on the flat surface of the FPD.

Appropriate software provides the requisite interrelation between detected forces and command processing. The software also provides signal filtering to enhance signal processing for the command processing.

In preferred embodiments of the present invention, pressure on a single point of the touch screen is utilized to also provide sound responses to simulate tactile and communication feedback effects (i.e., button pushing feel). Through the use of a combination of touch, sound and pressure sensitivity, utilization of the touch screen can be made sight independent. Appropriate pressure as detected by the strain gage sensors, may be utilized to provide variations in commands and interpretation, e.g., 10 points of pressure may be indicative of a "yes" response or command, whereas a recognizably distinct 50 points of pressure is indicative of a "no" response or command. Alternatively, a single command or interpretation is effected at a pressure site, but with variations in pressure providing variations thereof, e.g., color variations at different pressures (pink/red/maroon), with higher pressures being indicative of deeper colors. Differently language equivalents may also be differentiated by degree of pressure as well. Touch/sound/pressure on this and other systems which provide this combination can also utilize other features:

(a) different sound effects through pressure (e.g., tones, chords, etc.);

(b) controlling video responses through this system of different layers of touch pressure, via sound signals;

(c) identification and retrieval use, such as "you selected "product name", press harder to "retrieve", or play music or movie at different pressures; and (d) an interface which allows for a universal language or standard on computer screens or control panels.

DETAILED DESCRIPTION OF THE DRAWINGS AND THE PREFERRED EMBODIMENT

Figure 3:
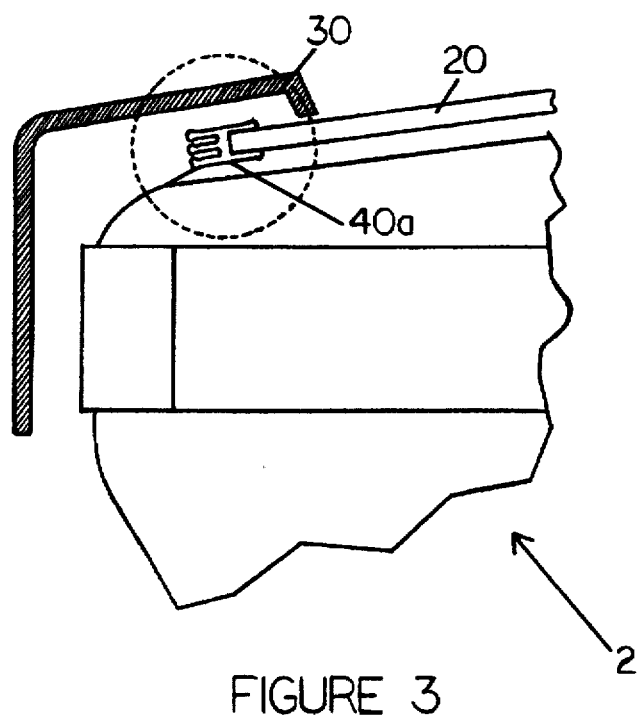
FIG. 3 is a cross section view taken along line 3—3 of FIG. 1.
Figure 2:
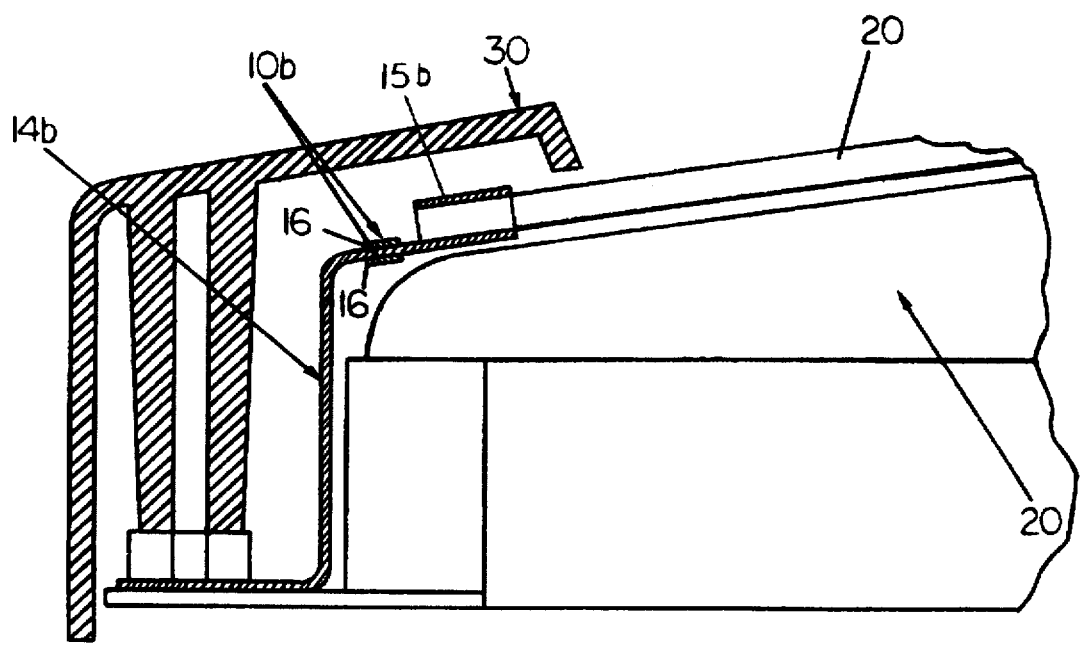
FIG. 2 is a cross section view taken along line 2—2 of FIG. 1.

With reference to the drawings, four strain gages 10a–d are depicted as being placed on a touch screen 20 in FIGS. 1 with glass touch screen panel 20 being closely retained by four corner brackets 14a–d. As shown in FIG. 2, with a cross section view of bracket 14b, the corner of the glass panel 20 is closely retained within metal clip 15b of bracket 14b and epoxy bonded thereto. The strain gage sensor 10b is soldered with solder 16 between metallized areas thereon (not shown), and the mounting stand of bracket 14b. As a result the strain gage sensor 10b (with a c-shape configuration) sandwiches a section of the mounting bracket 14b, adjacent the metal clip 15b, with retained glass of touch panel 20. Strain engendered by a touching of the glass panel at a particular position of the surface thereof, causes a measurable deflection of the glass, which is in turn transmitted through the metal of the bracket to gage sensor 10b (similar transmissions occur to the remaining gages 10a, 10c and 10d). The gages are electrically interconnected and connected to external elements for translation of measured strain, via resistance level changes in the polysilicon strain gage, to events or measurements. As shown in FIGS. 1 and 3, wires 40a–d effect such electrical connection and interconnection. The strain gages 10a–d are protected from exterior elements by front bezel 30 which peripherally encloses the edges of panel 20.

Figure 4:
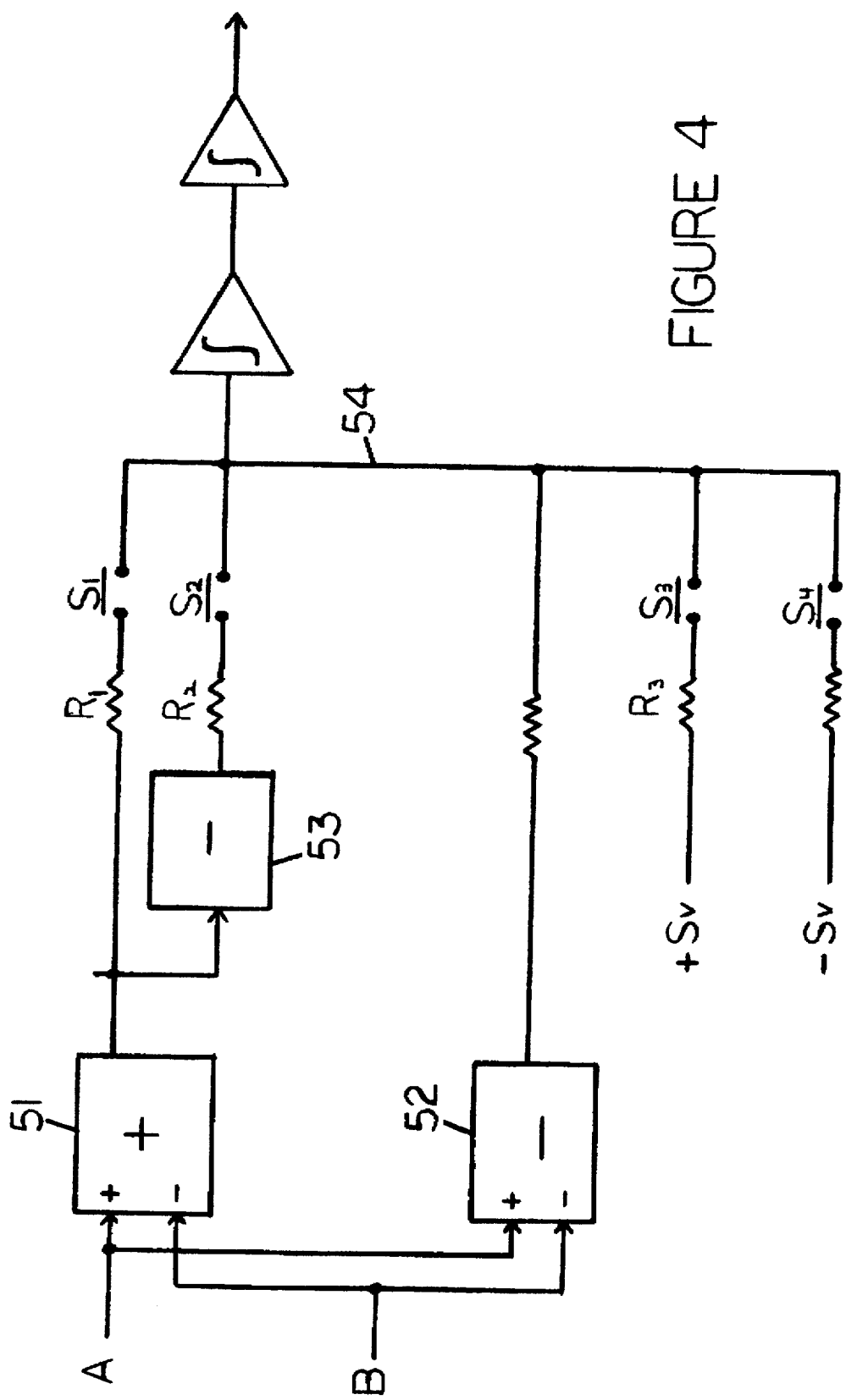
FIG. 4 is a block schematic of the position determining means with charge balancing and multiplying analog-to-digital converter of the present invention.

As shown in the block diagram of FIG. 4, of an analog to digital converter of the present invention, input A represents the input from the two left hand sensors 10a and 10d and input B represents the input from the two right hand sensor 10b and 10c. When a point is touched on touch screen 20, at any place along line 50 (equidistant from left and right side edges 20a and 20b of the panel 20), the values of A and B are equal. Touching of the screen closer to one side increases the value input from nearer sensors and decreases the value input from the farther sensors.

In operation, for example, if a point on line 50 is touched, the values of A and B are equal, e.g., with 1 volt from each being summed at voltage summer 51. The difference is obtained at voltage difference element 52, with respective output values of 2 volts and 0 volts respectively. Voltages of +2 and −2 (negative voltage is obtained through inverter 53) pass through resistors $R_1$ and $R_2$ to switches $S_1$ and $S_2$, respectively. Since there is zero voltage at $R_3$, in order to keep the summing junction 54 at an overall zero value, it is necessary to close switches $S_1$ and $S_2$ for equal amounts of time ($S_1/S_2$ is 50%/50%) during the duty cycle.

If a point at left hand edge 20a is touched, the input value from A is 1 volt and the input value from B is zero volts. Thus the values at resistors $R_1$, $R_2$ and $R_3$ are +1, −1, and +1 respectively. The logic to keep the summing junction 54 at an overall zero value requires that $S_2$ be closed at all times and $S_1$ remain open at all times during the duty cycle.

Different points on the screen have proportional logic values for the relative percentages of open and closed times for switches $S_1$ and $S_2$. Vertical position on the screen is similarly determined by a top input of gages 10a & 10b relative to the bottom input of gages 10c and 10d. Switches $S_3$ and $S_4$ are preset to cancel the junction, prior to touch.

The zero summing junction for the block diagram shown in FIG. 4 is $0=S_1 \cdot (A+B) - S_2 \cdot (A-B) + (A-B) + 5v \cdot S_3 - 5v \cdot S_4$. The X position=(duty of $S_2$)−(duty of $S_1$) and it ranges from +1.0 to −1.0, and is represented in accordance with block diagram in FIG. 4 as $X = A-B/A+B$.

Figure 5:
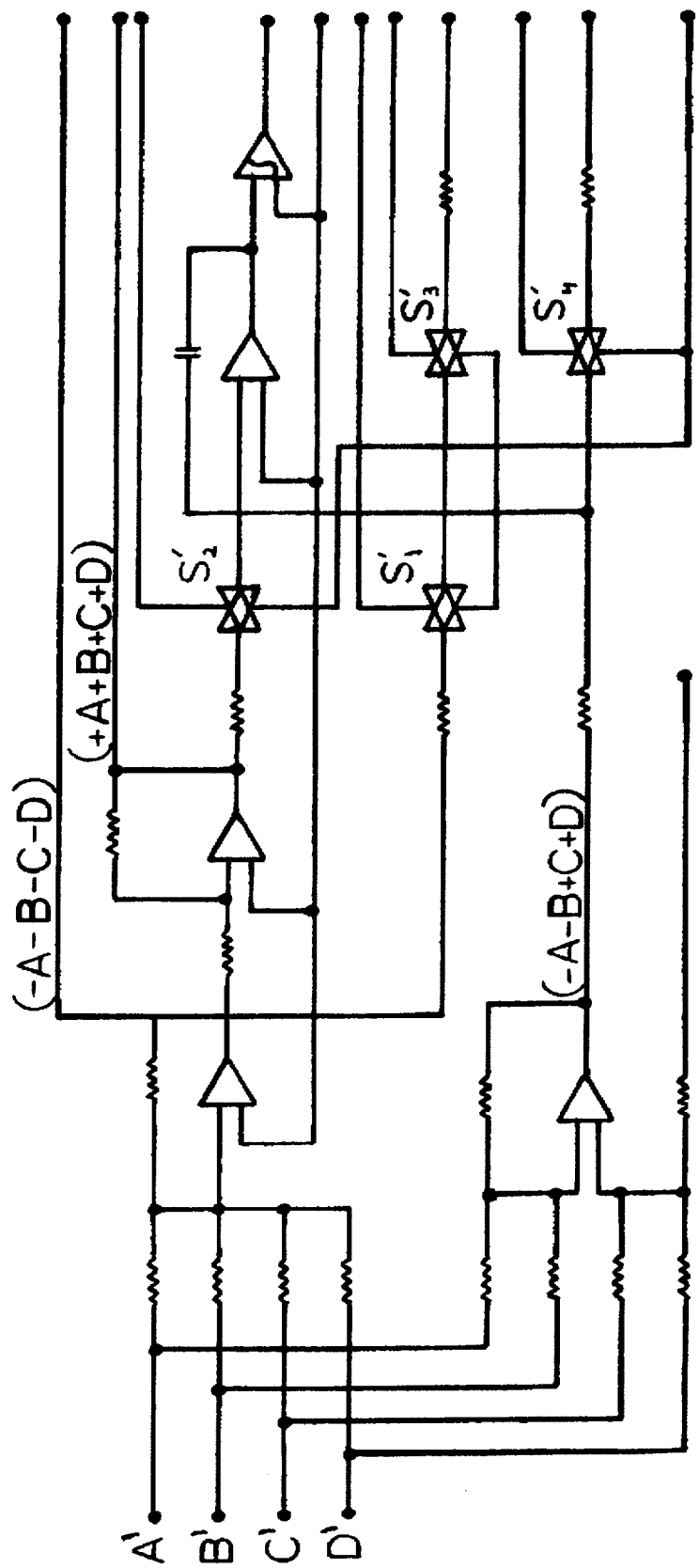
FIG. 5 is a circuit drawing of the position determining means of the block schematic of FIG. 4.

FIG. 5 is the overall circuit diagram for the system with separated inputs A', B', C', and D' from sensors 10d (lower left), 10a (upper left), 10b (upper right) and 10c (lower right) respectively and with logic switches $S_1'$, $S_2'$, $S_3'$, and $S_4'$.

Figure 6:
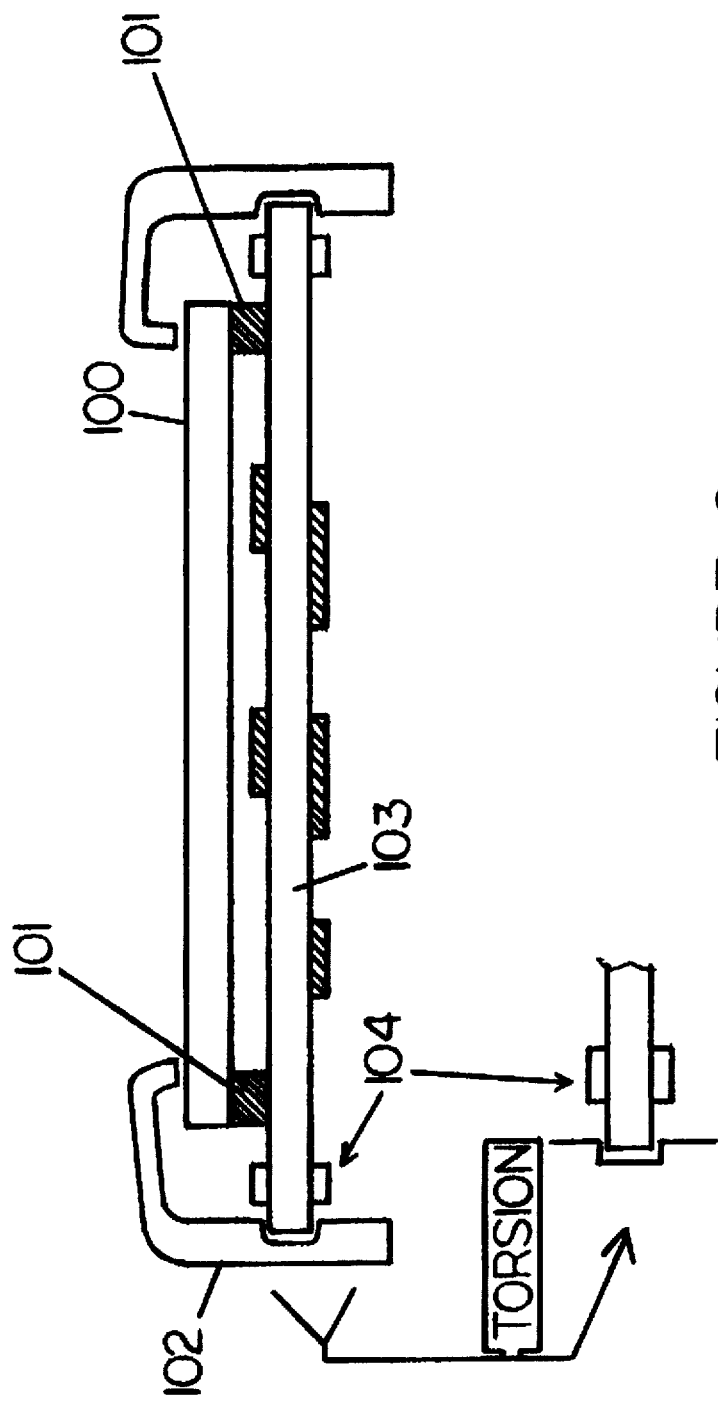
FIG. 6 is a schematic side view depiction of a support structure for a flat panel display.

In FIG. 6, a flat panel display 100 is utilized as the bending beam. The display 100 is mounted on mechanical stand members 101 and held in place by frame 102. The mechanical stand members 101 are sandwiched between the flat panel display 100 and the circuit board 103, with the latter also being held by frame 102. Sensors 104, affixed to the circuit board 103 directly measure torsion forces transmitted thereto from the flat panel display. Alternatively the sensors can be housed in ceramic packages which function as a load cell or transducer and/or support for the display, in lace of the circuit board.

It is understood that the above description, the drawings and discussion of specific embodiments of the present invention are not to be construed as limitations thereof. Changes in circuit, arrangement of elements, the nature of the elements, including different sensor means and the like, are possible without departing from the scope of the present invention as defined in the following claims.

What is claimed is:

1. A touch screen comprising sensors for monitoring relative distribution of force thereon, said sensors being positioned relative to the touch screen such that bending strain on the touch screen, engendered by touch, is detected by the sensors, wherein said sensors transmit one or more input signals to a charge balancing and multiplying analog to digital converter configured to relate bending force to an identifiable unique position on the screen, the charge balancing and multiplying analog to digital converter comprising a sum and divide analog-to-digital converter using charge balancing and integration, wherein said sensors provide sensing and valuation of touch forces on said screen, from opposite sides of said screen, with conversion of the valuation of the touch forces from opposite sides of the screen to separate proportional charge signals, whereby a balance charge comes from the plus and minus sum of the sensing of touch forces on said screen from opposite sides thereof, and means for converting the balance charge to a position on the screen, wherein said screen is quadrilateral and wherein said sensors include at least four sensors positioned at the four corners of the quadrilateral screen, wherein an input signal is the difference between proportional charge signals from two opposite sides of the screen and wherein the input signal is divided by the sum signal and the sum of charge counts over a fixed interval, resulting in an output value used by the means for converting the balance charge to a position on the screen.

2. The touch screen of claim 1, wherein the screen is comprised of a relatively stiff, low mass material, wherein the relative stiffness is such that it permits for detectable and reproducible bending movement of the screen under exerted touch forces, and the mass is such that damping effects, which may interfere with the detection of the magnitude of the bending movement, is minimized.

3. The touch screen of claim 2, wherein the screen is fixedly held in position by a metal stand, with the screen being held by metal brackets at the corners of the screen, and wherein said metal brackets transmit the bending forces exerted on said screen to said sensors.

4. The touch screen of claim 3, wherein said sensors comprise strain gages integrated with said brackets.

5. The touch screen of claim 4, wherein pairs of strain gages at opposite sides of the quadrilateral provide input signals for both horizontal and vertical position determination on said screen.

6. The touch screen of claim 1, wherein said screen comprises a CRT.

7. The touch screen of claim 1, wherein said screen comprises a touch panel.

8. The touch screen of claim 1, further comprising touch pressure sensing means whereby pressure on a single point of the touch screen is detected by said pressure sensing means to provide sound responses to simulate tactile and communication feedback effects.

9. The touch screen of claim 1, further comprising touch pressure sensing means whereby degree of pressure on a single point of the touch screen, having operational instructions associated therewith, is detected by said pressure sensing means to provide variations in commands and interpretation.

10. The touch screen of claim 8, wherein one range of pressure causes said pressure sensing means to provide a "yes" response or command, whereas a recognizably distinct second pressure range causes said pressure sensing means to provide a "no" response or command.

11. The touch screen of claim 10, wherein the touch screen is part of a flat panel display and wherein the flat panel display functions as the bending beam when touched, wherein said display is mounted on at least one mechanical stand member and peripherally held in place by a frame member, with the mechanical stand member being sandwiched between the flat panel display and a force transmitting member, held in stationary relation to the flat panel display, said force transmitting member having force sensors affixed thereto for detecting touch pressure exerted on said flat panel display.

12. The touch screen of claim 11, wherein said force transmitting member comprises a circuit board.

13. The touch screen of claim 11, wherein said force transmitting member comprises a housing for said force sensors.

14. A touch screen device comprising:
   a first sensor and a second sensor positioned relative to opposing sides of a touch screen, such that bending strain on the touch screen, engendered by touch, is detected by the first and second sensors, the first and second sensors outputting respective first and second sensor signals; and a charge balancing and analog to digital converter having a difference signal input, a positive charge sum input, and a negative charge sum input, said difference signal input coupled to a difference of the first and second sensor signals, the positive charge sum input coupled to a sum of the first and second sensor signals, the negative charge sum input coupled to a negative sum of the first and second sensor signals, the charge balancing analog to digital converter relating a bending force applied to the touch screen to an identifiable position on the display screen as a function of the first and second sensor signals.

15. The touch screen device according to claim 14, wherein the charge balancing and analog to digital converter further comprises an integrator having an integrator input, the integrator input and the difference signal input being coupled to a common node, the positive charge sum input and negative charge sum input being selectively coupled to the common node to provide a balance charge to the common node.

16. The touch screen device according to claim 14, wherein the touch screen is a display screen.

17. The touch screen device according to claim 14, wherein the touch screen is a flat panel display.

18. The touch screen device according to claim 14, wherein the touch screen is a measuring device.

* * * * *